(12) United States Patent
Friday et al.

(10) Patent No.: US 7,047,014 B1
(45) Date of Patent: May 16, 2006

(54) RASTER-TO-VECTOR CONVERSION OPERATIONS ADAPTED TO MODELING OF RF PROPAGATION

(75) Inventors: Robert J. Friday, Los Gatos, CA (US); Paul F. Dietrich, Seattle, WA (US); Gregg Scott Davi, Milpitas, CA (US)

(73) Assignee: Airespace, Inc., San Jose, CA (US)

( * ) Notice: Subject to any disclaimer, the term of this patent is extended or adjusted under 35 U.S.C. 154(b) by 12 days.

(21) Appl. No.: 10/982,153

(22) Filed: Nov. 5, 2004

(51) Int. Cl.
*H04Q 7/20* (2006.01)

(52) U.S. Cl. ............ 455/446; 455/63.2; 455/418; 382/113; 382/165; 382/177; 345/581; 345/619; 345/625

(58) Field of Classification Search .......... 445/63.1, 445/63.2, 418, 446, 524, 525; 382/113, 165, 382/177; 345/443, 581, 82, 600, 619, 625, 345/631; 707/1, 10, 101; 703/22

See application file for complete search history.

(56) References Cited

U.S. PATENT DOCUMENTS

| | | | | |
|---|---|---|---|---|
| 4,254,467 A | * | 3/1981 | Davis et al. | 345/443 |
| 5,028,848 A | * | 7/1991 | Bankston et al. | 315/364 |
| 5,396,582 A | * | 3/1995 | Kahkoska | 358/1.3 |
| 6,134,338 A | * | 10/2000 | Solberg et al. | 382/113 |
| 6,226,400 B1 | * | 5/2001 | Doll | 382/163 |

(Continued)

OTHER PUBLICATIONS

Steven Fortune, "Algorithms for prediction of indoor radio propagation", sif@research.att.com, Jan. 7, 1998, Bell Laboratories, Murray Hill, New Jersey 07974.

(Continued)

*Primary Examiner*—Steve M. D'Agosta
(74) *Attorney, Agent, or Firm*—Mark J. Spolyar

(57) ABSTRACT

Methods, apparatuses and systems directed to optimizing vector models for use in modeling RF propagation in desired physical environments. In one embodiment, the present invention can operate on pre-existing vector models. In other implementations, the present invention facilitates the conversion of raster images of buildings and other physical locations to vector formats for use in connection with the computational modeling of radio-frequency (RF) propagation. According to certain embodiments, the present invention is implemented within the context of a location diagram editing application that supports a line recognition filter, a snap filter and a merge filter which a user may individually select and configure. As discussed more fully below, the line recognition filter operates on the vector objects to adjust near-vertical lines (as defined by a configurable threshold angle) to vertical, and near-horizontal lines to horizontal. In some configuration modes, the line recognition filter may also delete lines that are oriented at an angle greater than a threshold from the x-axis and y-axis to, for example, clean up vector objects corresponding to text and other elements that are usually analytically irrelevant to modeling RF propagation. The snap filter, in one implementation, operates to extend closely spaced objects that are oriented within a threshold distance from each other. The merge filter operates, in one implementation, to merge closely spaced parallel lines to, for example, adjust the vector file to correctly model a wall with a single vector object. In one implementation, the output resulting from the invention is a vector file that has each wall accorded a given wall type, and is optimized for use in connection with an RF prediction engine.

30 Claims, 15 Drawing Sheets

U.S. PATENT DOCUMENTS

| | | | |
|---|---|---|---|
| 6,317,599 B1* | 11/2001 | Rappaport et al. | 455/446 |
| 6,804,394 B1* | 10/2004 | Hsu | 382/173 |
| 6,850,946 B1* | 2/2005 | Rappaport et al. | 707/101 |
| 2002/0154134 A1* | 10/2002 | Matsui | 345/582 |
| 2004/0151377 A1* | 8/2004 | Boose et al. | 382/193 |
| 2004/0186847 A1* | 9/2004 | Rappaport et al. | 707/101 |
| 2004/0236547 A1* | 11/2004 | Rappaport et al. | 703/2 |
| 2004/0259554 A1* | 12/2004 | Rappaport et al. | 455/446 |
| 2004/0259555 A1* | 12/2004 | Rappaport et al. | 455/446 |

OTHER PUBLICATIONS

A. Rajkumar, B.F. Naylor, F. Feisullin and L. Rogers, "Predicting RF Coverage in Large Environments using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune, and Jonathan Ling, "Indoor Propagation Prediction Accuracy and Speed Versus Number of Reflections in Image-Based 3-D Ray-Tracing", 1998, Bell Laboratories, Lucent Technologies, Holmdel, NJ 07733.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 26, 2006]. Retrieved from the Internet: <http://research.microsoft.com/~padmanab/papers/radar.pdf>.

* cited by examiner

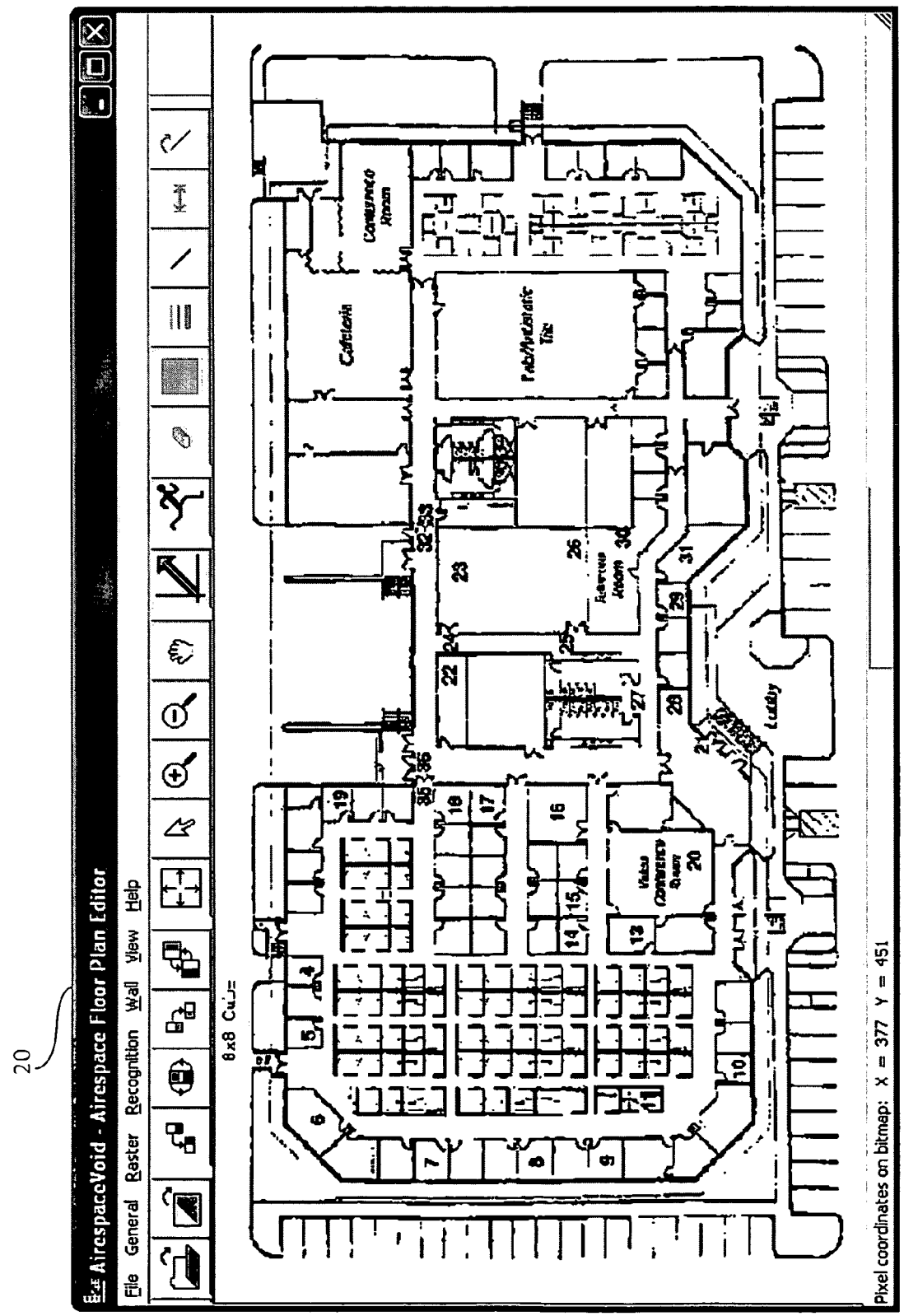
Fig._1B

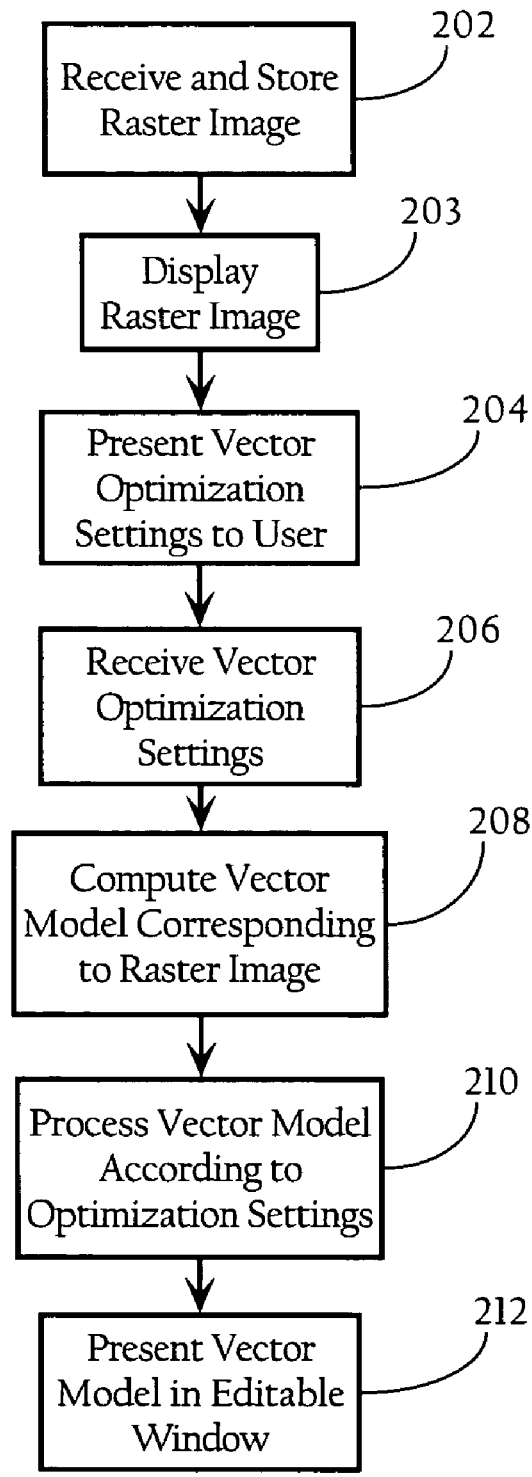
Fig._2

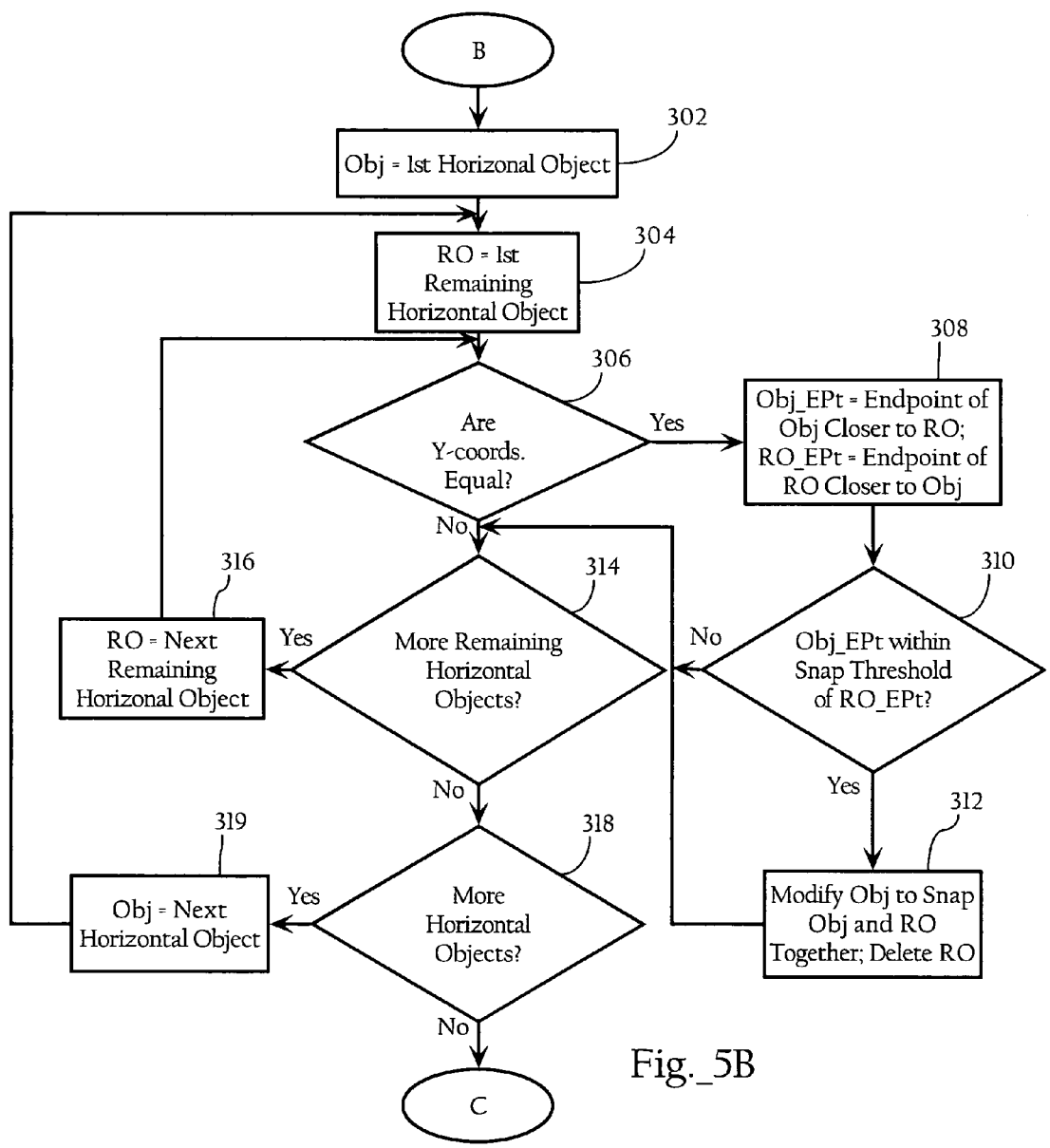
Fig._5B

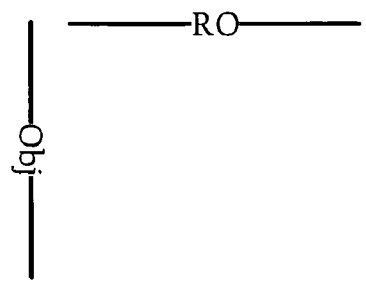
Fig._5D
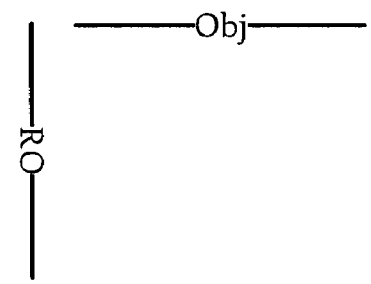
Fig._5E
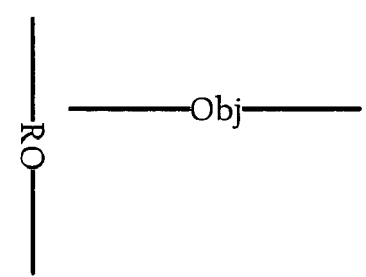
Fig._5F
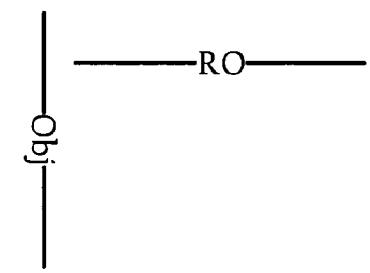
Fig._5G
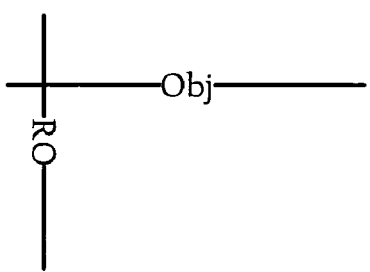
Fig._5H

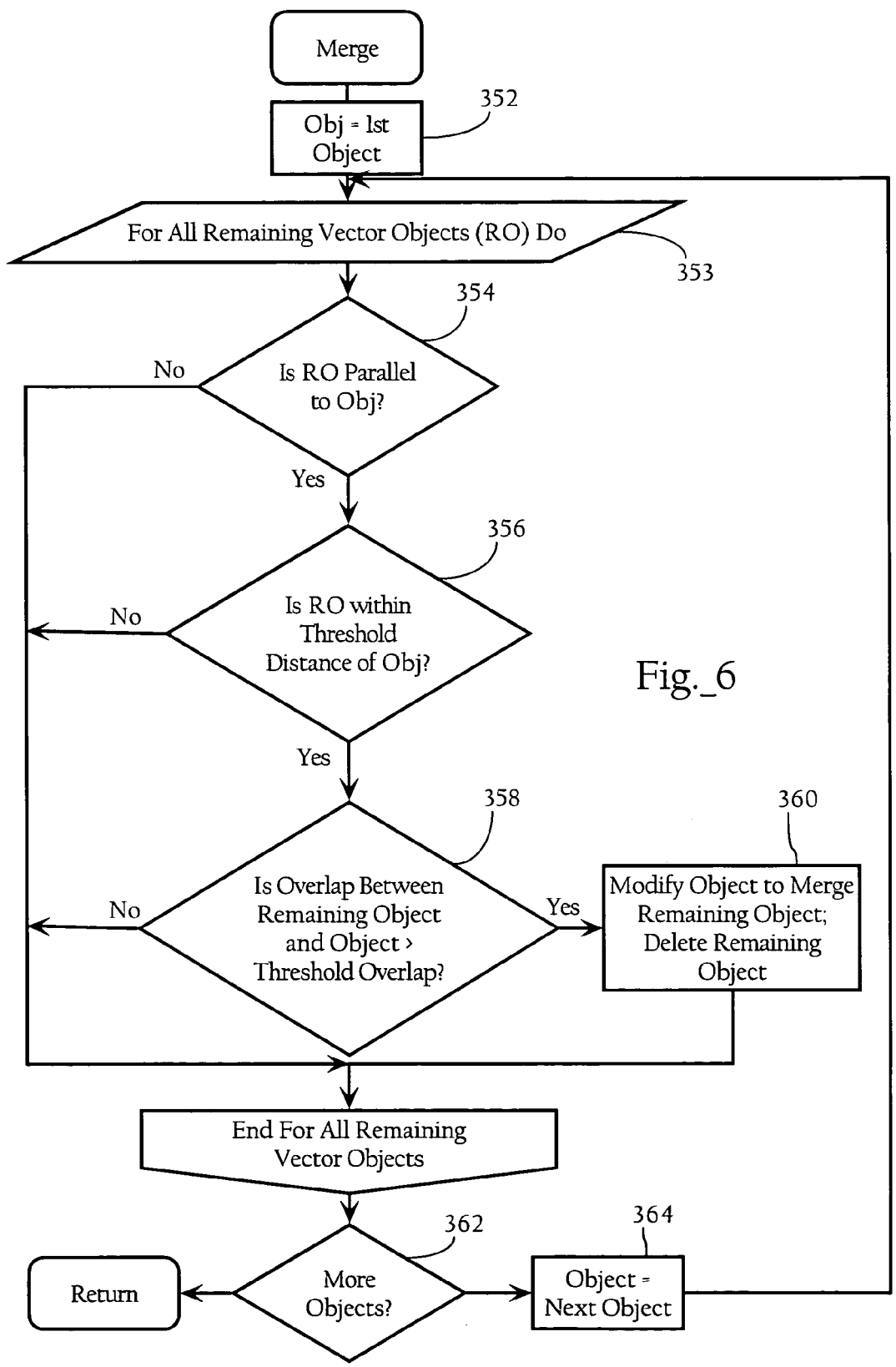
Fig._6

```
<HEAD>
VERSION = 2.0
CREATIONDATE = 10/05/2004 12:54PM
UNITS = FEET
ORIGINPIXEL = 0.0000000 0.0000000
FILESIZE = 132409
RASTERFILETYPE = PNG
OFFSETTORASTER = 47376
SCALEFOOTPIXEL = 0.3645378
WIDTHPIXEL = 593
HEIGHTPIXEL = 263
</HEAD>
<VDATA>
<L>
4.8605035 87.6713328 9.2957130 87.6713328
T = 0.5000000
C = BLUE
</L>
<L>
16.0396617 86.6384757 18.5914261 86.6384757
T = 0.5000000
C = BLUE
</L>
<L>
. . .
</VDATA>
<IMAGE>
‰PNG
▯IHDR  Q▯  !„þ   IDA▯xœì⅄ yŒdÙUÿyÞ‹}▯È-²¶îêÆ6ü . . .
. . .
. . .
</IMAGE>
```

Fig._7

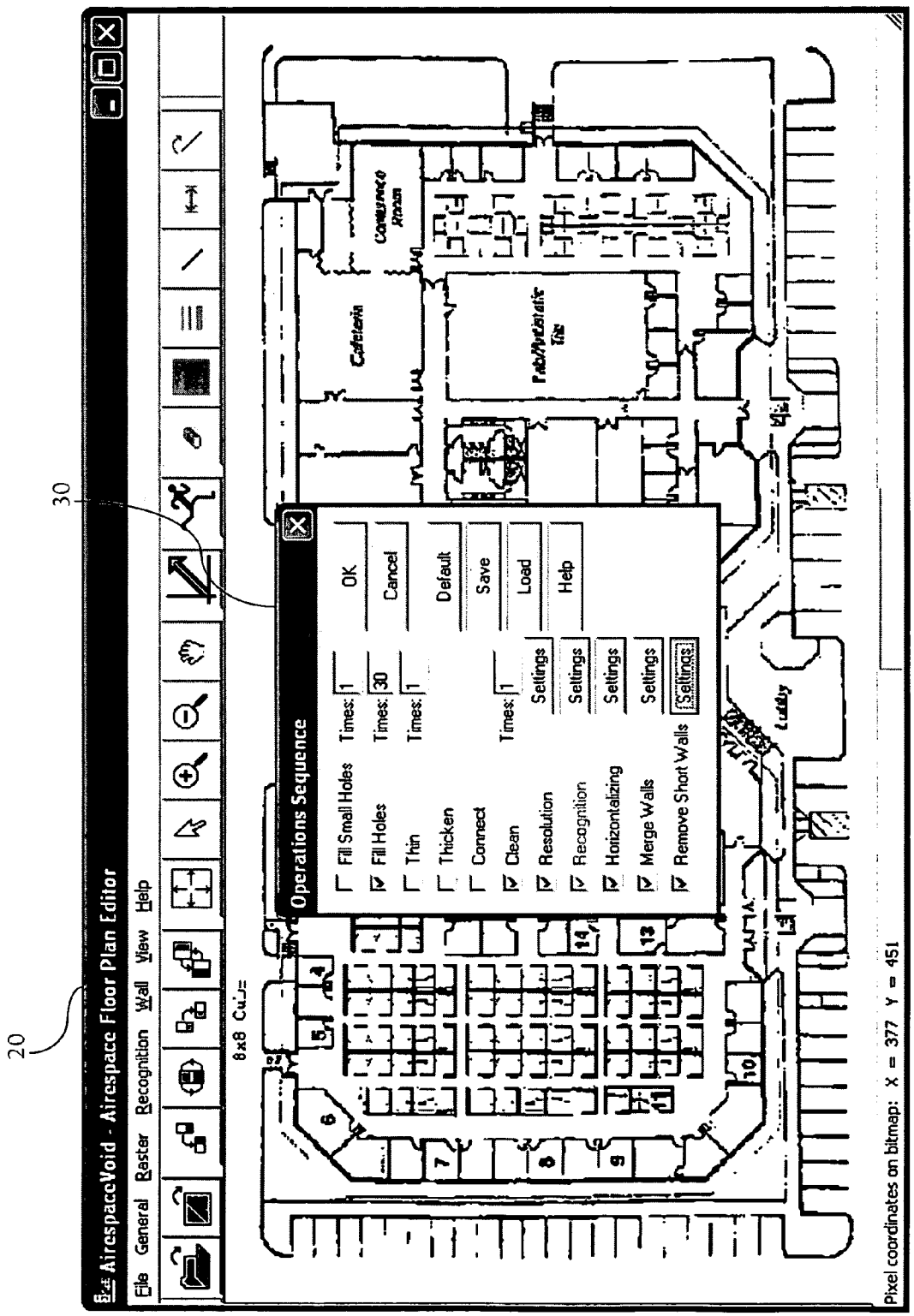
Fig_8

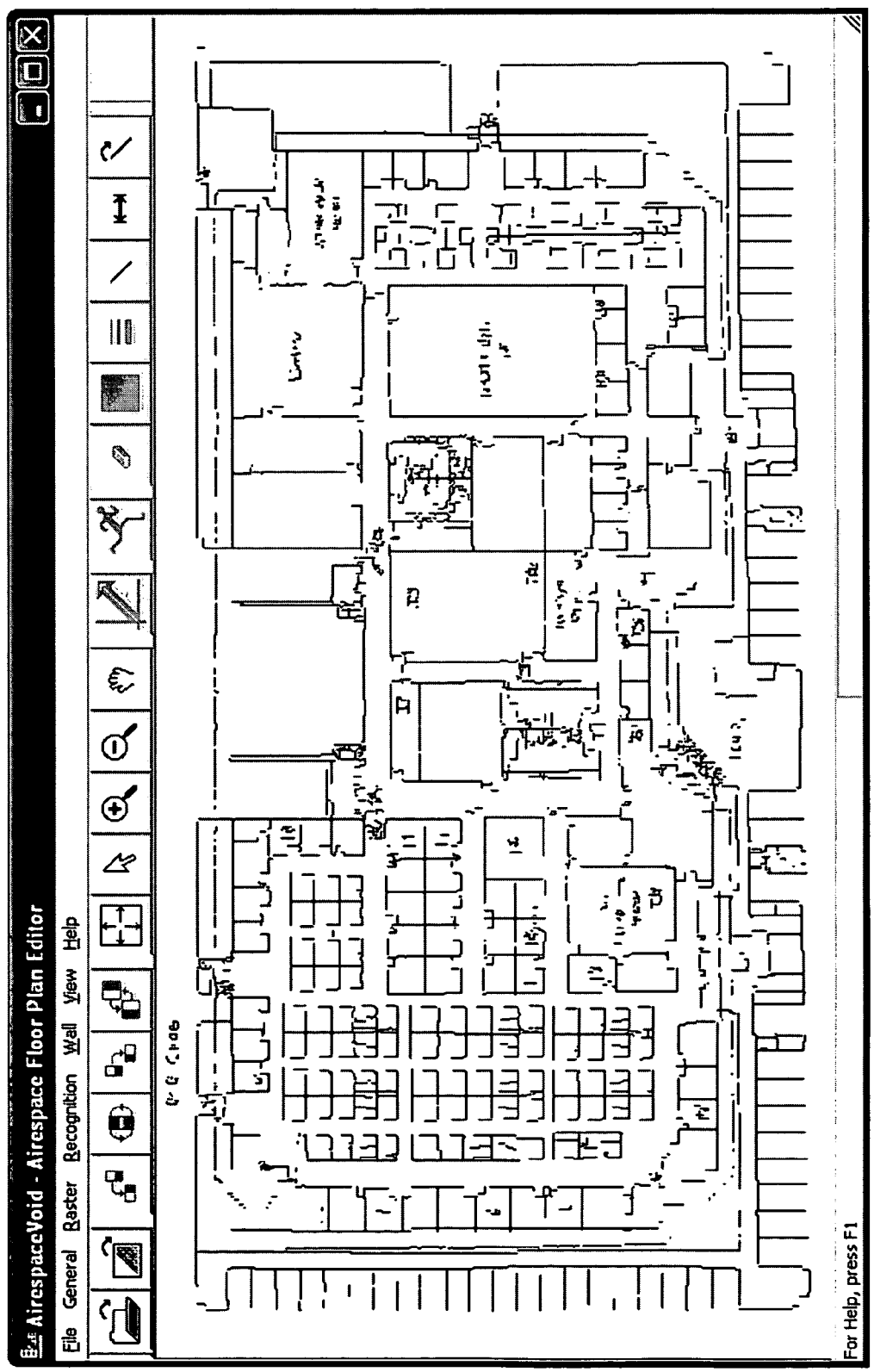
Fig._9

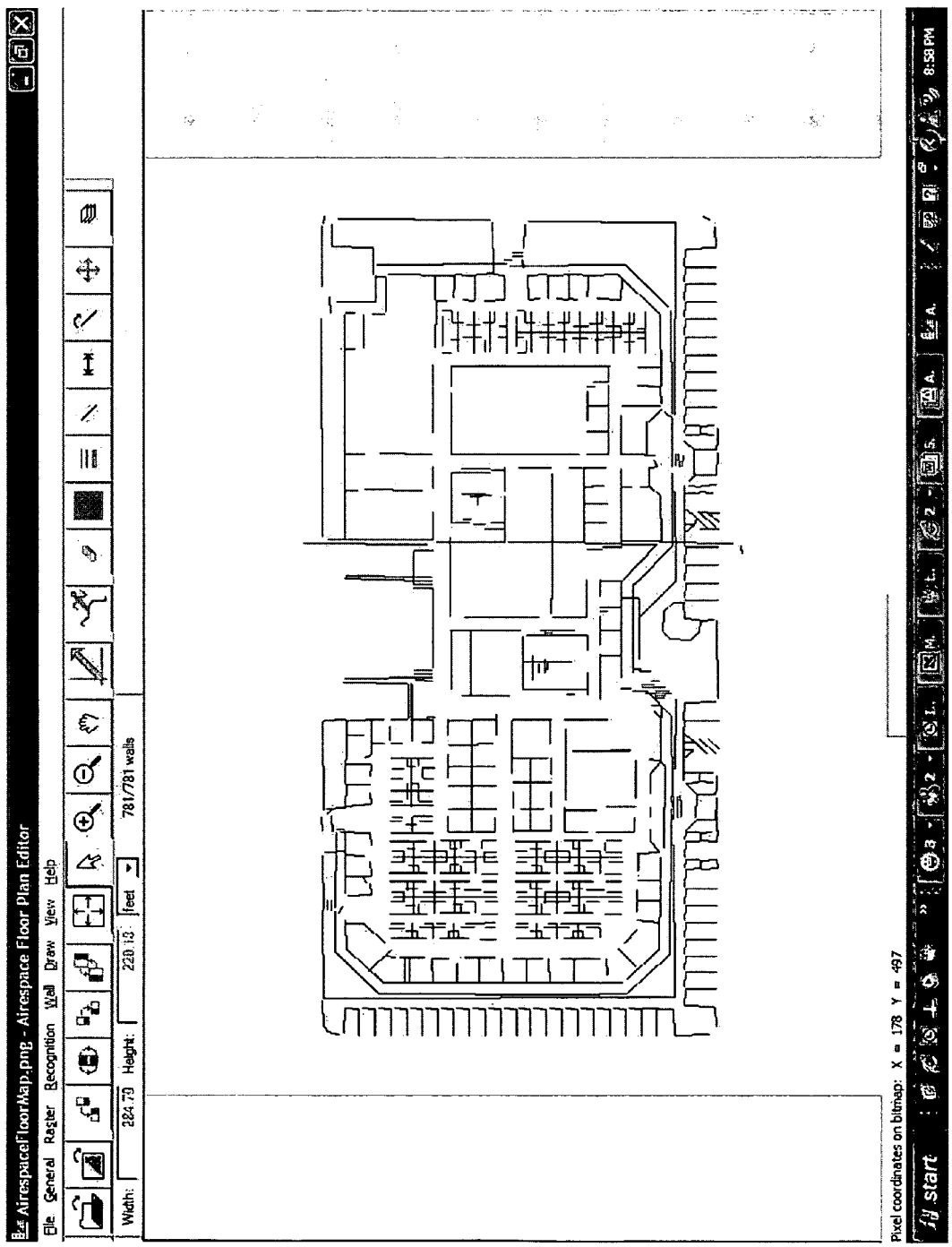
Fig._10

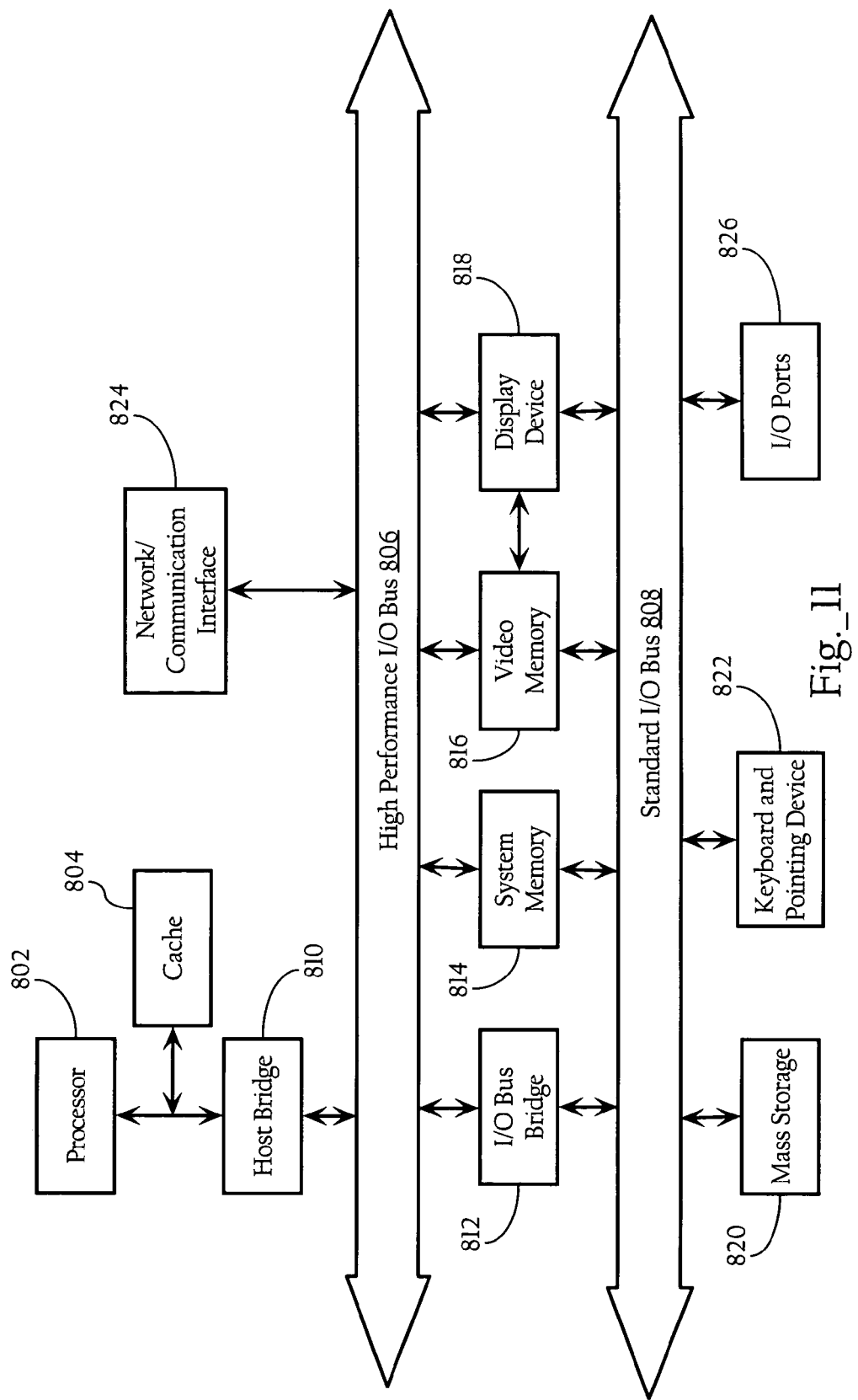

RASTER-TO-VECTOR CONVERSION OPERATIONS ADAPTED TO MODELING OF RF PROPAGATION

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/802,366 in the name of Paul F. Dietrich, Gregg Scott Davi and Robert J. Friday, entitled "Location of Wireless Nodes Using Signal Strength Weighting Metric;" and U.S. patent application Ser. No. 10/848,276 in the name of Paul F. Dietrich, Gregg Scott Davi and Robert J. Friday, entitled "Wireless Node Location Mechanism Featuring Definition of Search Region to Optimize Location Computation."

FIELD OF THE INVENTION

The present invention relates to the conversion of raster or bitmap files to vector formats and, in one implementation, to methods, apparatuses and systems facilitating the conversion of raster images of buildings and other physical locations to vector formats for use in connection with the computational modeling of radio-frequency (RF) propagation.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, the appropriate deployment and configuration of wireless access points in a wireless network environment becomes critical to performance and security. To ascertain the coverage and other performance attributes of a wireless network deployment, RF prediction can be used to construct site-specific models of RF signal propagation in a given wireless network environment. RF prediction uses mathematical techniques, such as ray tracing, to model the effects of physical obstructions, such as walls, doors, windows, and the like, on RF signal propagation in a desired environment. For example, S. Fortune, "Algorithms for Prediction of Indoor Radio Propagation," Technical Memorandum, Bell Laboratories (1998), disclose various algorithms that can be used to predict radio signal propagation. Valenzuela et al., "Indoor Propagation Prediction Accuracy and Speed Versus Number of Reflections in Image-Based 3-D Ray-Tracing," Technical Document, Bell Laboratories (1998), describe algorithms for modeling RF signal propagation in indoor environments. In addition, Rajkumar et al., "Predicting RF Coverage in Large Environments using Ray-Beam Tracing and Partitioning Tree Represented Geometry," Technical Document, AT&T Bell Laboratories (1995), also disclose methods for predicting RF signal propagation in site specific environments.

Still further, the rapid proliferation of lightweight, portable computing devices and high-speed WLANs enables users to remain connected to various network resources, while roaming throughout a building or other physical location. The mobility afforded by WLANs has generated a lot of interest in applications and services that are a function of a mobile user's physical location. Examples of such applications include: printing a document on the nearest printer, locating a mobile user or rogue access point, displaying a map of the immediate surroundings, and guiding a user inside a building. The required or desired granularity of location information varies from one application to another. Indeed, the accuracy required by an application that selects the nearest network printer, or locates a rogue access point, often requires the ability to determine in what room a wireless node is located. Accordingly, much effort has been dedicated to improving the accuracy of wireless node location mechanisms.

The analysis of radio signal attenuation to estimate the location of a wireless device or node is known. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, and absorption. In many business enterprise environments, most location-tracking systems are based on RF triangulation or RF fingerprinting techniques. RF fingerprinting compares the strength of signals transmitted by infrastructure access points (or mobile stations) with a database that contains an RF physical model of the coverage area. This database is typically populated by either an extensive site survey or by the use of RF prediction to develop a model of RF signal propagation in a given environment. For example, Bahl et al., "A Software System for Locating Mobile Users: Design, Evaluation, and Lessons," describes an RF location system (the RADAR system) in a WLAN environment, that allows a mobile station to track its own location relative to access points in a WLAN environment. In addition, the patent applications identified above describe a location tracking system that estimates the location of a mobile station based on the signal strengths of the mobile stations, as detected by access points in a WLAN environment.

RF prediction algorithms typically require that a given environment be modeled as a series of discrete physical objects, including location information and other physical parameters, such as wall type and the like. To that end, vector models are used to model the physical environments. A vector model is, in essence, an abstraction of various physical objects where positional data is represented in the form of coordinates. In vector data, the basic units of spatial information are points and lines. For example, a line can be expressed as a pair of coordinate locations corresponding to the end points of the line. Each vector object is self-contained, with properties such as color, shape, thickness, size, and position. Accordingly, RF prediction algorithms require a vector model of a desired physical environment that, often times, does not exist. Indeed, most drawings of an office building (for example) that are available to network administrators are scanned, raster images of planning drawings. A raster drawing or image is an image represented by a sequence of pixels (picture elements) or points, which when taken together, describe the display of an image on an output device.

Some current technologies require a user to take a base CAD or basic raster drawing (i.e. JPG, GIF, BMP, etc.) and, within a vector modeling application, trace over it to create a vector model of the same drawing. Often times, however, this process can be time consuming as a large number of physical objects must be modeled, such as walls, partitions, etc. In addition, the amount of time required to produce vector models for a large number of buildings and other locations can be prohibitive. The need arises, therefore, for technologies that convert generic building, facility, or location diagrams and translate them into a form that the computer can actually use for calculations of distance, topology type, and wall type. To that end, raster-to-vector conversion software has been developed. For example, the AlgoLab Raster to Vector Conversion Toolkit, offered by AlgoLab, Inc. of London, Ontario, Canada, converts architectural, mechanical and various technical drawings from raster to vector formats. This allows a user to scan a paper drawing to create a raster image file. The raster-to-vector conversion software operates on the raster image file to automatically recognize line artwork and represent the image in a vector format that then can be imported to a CAD or drawing program.

While the raster-to-vector conversion software according to the prior art works for its intended objectives, these technologies are not specifically adapted to modeling of RF propagation in physical locations. For example, prior art raster-to-vector conversion technologies often create vector models that, sometimes due to the attributes of the raster image, include a number of small vector objects that together correspond to a single wall or other object in the actual physical environment. For example, an image including a diagonal line often appears jagged after it has been scanned, causing many prior art raster-to-vector conversion tools to create a plurality of vector objects. Optimally, however, RF prediction algorithms operate more efficiently and accurately when the wall is represented as a single vector object. As another example, walls are often represented in schematic drawings with two or more parallel lines. For purposes of RF prediction, these multiple parallel lines must be converted into a single vector object. In addition, the scanned and vectorized images may also include small pieces of information noise due to the graininess (or other artifacts) in the raster image, as well as other objects, that are not relevant to modeling RF propagation. These circumstances often require a user to make substantial modifications to the vector model, such as creating a single object to represent a wall, and erasing small objects that represent noise or are otherwise irrelevant (or have a de minimis impact) to RF propagation.

In light of the foregoing, a need exists in the art for methods, apparatuses and systems that facilitate the modeling of RF environments for use in RF prediction and other technologies that model RF propagation. Embodiments of the present invention substantially fulfill this need.

SUMMARY OF THE INVENTION

The present invention provides methods, apparatuses and systems directed to optimizing vector models for use in modeling RF propagation in physical environments. In one embodiment, the present invention can operate on pre-existing vector models. In other implementations, the present invention facilitates the conversion of raster images of buildings and other physical locations to vector formats for use in connection with the computational modeling of radio-frequency (RF) propagation. According to certain embodiments, the present invention is implemented within the context of a location diagram editing application that supports a line recognition filter, a snap filter and a merge filter which a user may individually select and configure. As discussed more fully below, the line recognition filter operates on the vector objects to adjust near-vertical lines (as defined by a configurable threshold angle) to vertical, and near-horizontal lines to horizontal. In some configuration modes, the line recognition filter may also delete lines that are oriented at an angle greater than a threshold from the x-axis and y-axis to, for example, clean up vector objects corresponding to text and other elements that are usually analytically irrelevant to modeling RF propagation. The snap filter, in one implementation, operates to extend closely spaced objects that are oriented within a threshold distance from each other. The merge filter operates, in one implementation, to merge closely spaced parallel lines to, for example, adjust the vector file to correctly model a wall with a single vector object. In one implementation, the output resulting from the invention is a vector file that has each wall accorded a given wall type, and is optimized for use in connection with an RF prediction engine.

DESCRIPTION OF THE DRAWINGS

FIG. 1B illustrates a graphical user interface presented by one implementation of the present invention.

FIG. 2 is a flow chart diagram illustrating an overall process flow according to one implementation of the present invention.

FIGS. 5A, 5B and 5C, together, are a flow chart diagram showing the process flow, according to one implementation of the present invention, corresponding to a snap filter.

FIGS. 5D, 5E, 5F and 5G provide didactic examples that graphically illustrate the concept of whether a given object can be extended into another object.

FIG. 6 is a flow chart diagram showing the process flow, according to one implementation of the present invention, corresponding to a merge filter.

FIG. 7 illustrates the format of a vector file according to one implementation of the present invention.

FIG. 8 illustrates a graphical user interface, according to one implementation of the present invention, that allows the user to configure one or more vector optimization operations.

FIG. 9 provides a graphical user interface, according to one implementation of the present invention, that contains a graphical representation of a vector model prior to application of vector optimization operations that optimize the vector model for use in connection with RF prediction algorithms.

FIG. 10 shows a graphical user interface, according to one implementation of the present invention, that contains a graphical representation of a vector model subsequent to application of vector optimization operations that optimize the vector model for use in connection with RF prediction algorithms.

FIG. 11 is a functional block diagram setting forth one possible system architecture for a general purpose computer on which embodiments of the present invention may be executed.

DESCRIPTION OF PREFERRED EMBODIMENT(S)

Figure 1A:
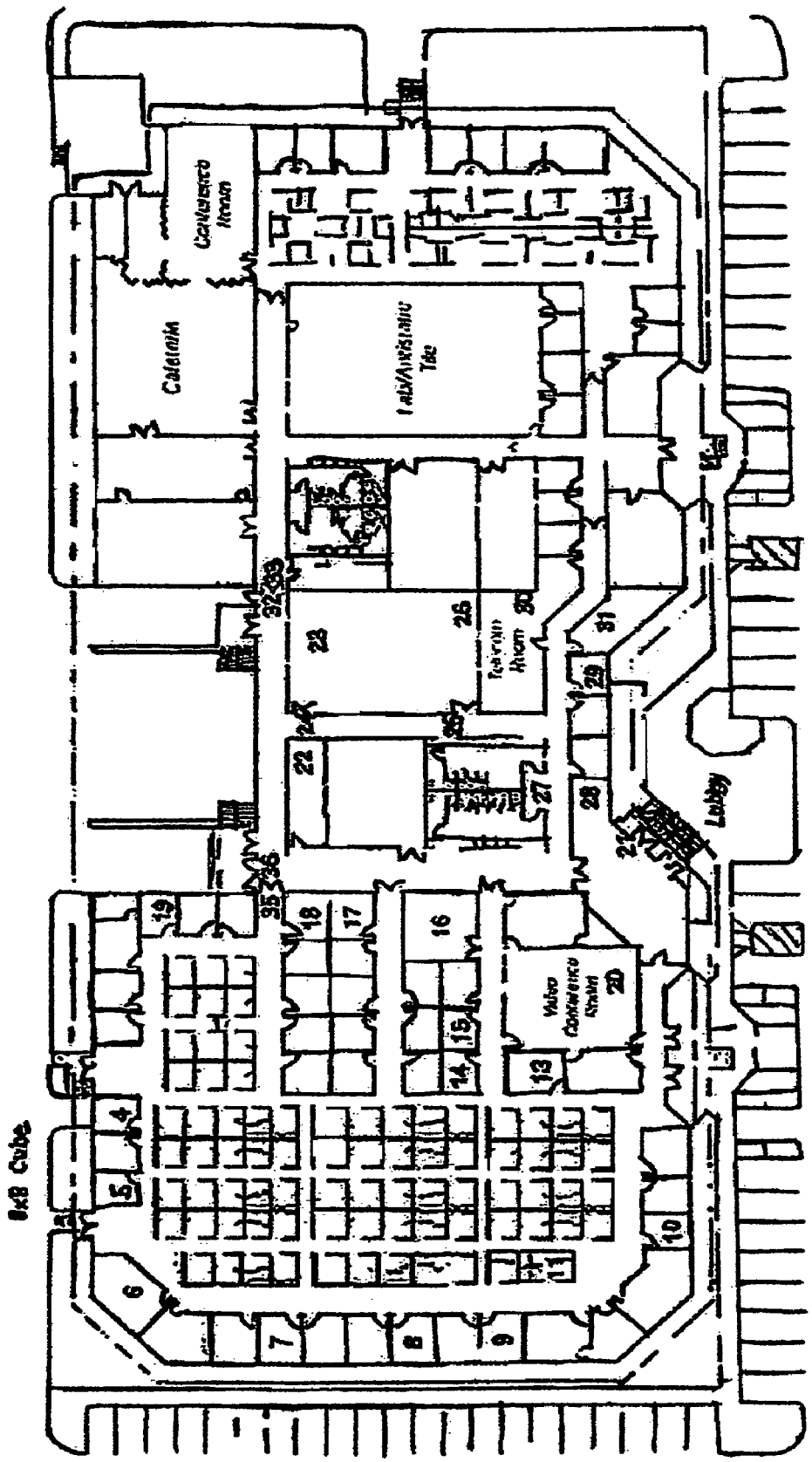
FIG. 1A represents a raster image of a floor plan in a typical enterprise environment.

As discussed in more detail below, embodiments of the present invention can be integrated into a location diagram editing application that facilitates the preparation of vector models of a desired physical environment for use in connection with modeling of RF propagation. FIG. 1A represents a drawing of a floor plan in a typical enterprise environment. In one implementation, the drawing is scanned or otherwise digitized and stored as a raster image, such as a bitmap (.bmp), JPEG, GIF or any other suitable raster file format. The floor plan drawing of FIG. 1A indicates the location and orientation of a variety of physical objects in the depicted environment, such as outer walls, interior walls, cubicles dividers, doors and the like. As FIG. 1A illustrates, the floor plan drawing also includes text, as well as small detail, that are not analytically relevant in modeling RF signal propagation within the depicted environment. FIG. 1B shows a graphical user interface presented by the location diagram editing application, according to one implementation of the present invention. As FIG. 1B illustrates, the graphical user interface 20, in one implementation, displays the raster image in a window, and also includes a pull-down menu command hierarchy and a series of command buttons by which the user may specify a variety of operations, such as setting vector optimization settings and filter parameters, selecting raster images for conversion, and the like.

FIG. 2 sets forth the overall process flow, according to one implementation of the present invention, directed to processing a raster image of a physical space to yield a vector model optimized for use in connection with RF prediction, and other RF signal propagation modeling, algorithms. The location diagram editing application receives a raster image file selected by a user and stores it in memory, such as the DRAM of the computer (202). As discussed above, the raster image file, in one implementation, is a scanned image of a diagram depicting a physical environment, such as a floor of a building, an outside area, and the like. In one implementation, a user may select a raster image file by selecting an "open" command from a pull-down menu and specifying the file location of a desired raster image. In one implementation, the location diagram editing application displays the raster image in a window (203), as FIG. 1B illustrates. In one implementation, the location diagram editing application allows the user to directly edit the raster image, such as erasing text and other parts of the image. Still further, the location diagram editing application, in one implementation, may allow the user to apply a speckle filter to the raster image, such as applying a filter based on the Fourier transform of the transition in intensity between adjacent pixels to weed out large spikes (or abrupt changes) in intensity (which typically correspond to grains and other artifacts in the scanning process, the paper used, etc. In one implementation, the parameters associated with the speckle filter are configurable by the user.

From the user interface presented by the location diagram editing application, a user may then be presented with a vector optimization configuration interface (204) in order to configure one or more vector optimization settings as discussed more fully below. After the locating diagram editing application has received the vector optimization settings, the user may select a "raster-to-vector" command, causing the location diagram editing application to process the raster image and create a corresponding vector model (208). In one implementation, a preliminary operation associated with the conversion from raster to vector includes the specification of the scale associated with the vector drawing. For example, the location diagram editing application may allow the user to set the scale by prompting the user to point-click at two locations in the raster image, and then prompting the user to specify the distance in feet or other units between the two locations. From this operation, the location diagram editing application may compute the scale of the raster image. As discussed more fully below, in one embodiment, the vector model is a set of lines computed by the location diagram editing application to represent the depicted image in the raster image file. Any suitable raster-to-vector conversion technologies can be used to convert the raster image to a vector image. For example, the location diagram editing application can incorporate the raster-to-vector conversion technologies contained in the AlgoLab Raster to Vector Conversion Toolkit, offered by AlgoLab, Inc. of London, Ontario, Canada. After the vector model has been computed, the location diagram editing application operates on the vector model according to the vector optimization settings specified by the user (210), see below, and presents a graphical representation of the modified vector model to the user in an editable window on the computer display (212). From this editable window, a user may manually modify the resulting vector model by manually selecting and reconfiguring individual filters, or by selecting and editing individual vector objects within the window.

FIG. 9 illustrates, for didactic purposes, a graphical representation of a vector model created from the raster image of FIG. 1 without application of vector optimization filters. As one skilled in the art will recognize, the vector model of FIG. 9 includes a variety of objects that are computationally irrelevant to the modeling of RF propagation, such as the objects corresponding to text in the figures. In addition, the vector model may also include several lines that are angled relative to the horizontal and/or vertical axis. The vector model of FIG. 9 also includes in some instances sets of closely-spaced parallel lines that correspond to a single wall in the actual physical environment. Furthermore, due to the attributes of the raster image, the scanning of the raster image, or the conversion of the raster image into vector form, the vector model may include several closely spaced objects that should be joined for purposes of modeling RF propagation. As discussed more fully below, the location diagram editing application includes vector model optimization operations that automatically operate on the vector model to address these and other circumstances. In addition, similar to CAD programs, the user may select one or more vector objects and manually modify them as desired. For example, the user may delete one or more selected vector objects, move or rotate one or more selected vector objects, assign colors, wall types, and the like. One skilled in the art will recognize how to modify the underlying vector file based on the modifications specified by the user using the graphical user interface 20.

FIG. 7 represents the format of a vector file according to one implementation of the present invention. As FIG. 7 illustrates, the vector file, in one implementation, comprises a <HEAD> portion, a series of line elements <L>, and an <IMAGE> portion. The <HEAD> portion, in one implementation, contains various meta data about the vector file, such as the version number of the location diagram editing application, the creation date of the file, the origin pixel, unit of measure (e.g., feet), scale information and the like. The line elements <L> contain the x- and y-coordinates of the line endpoints, a thickness value (T), and a color value (C). Each line element <L> may also contain one or more fields relevant to RF propagation. For example, each line element may also include a RF wall type indicator (RF) that is configured by a user. For example, the RF wall type indicator may be a numerical value corresponding to a given wall type (e.g., 1=door, 2=glass, 3=concrete, 4=partition, etc.). Other attributes may include fields specifying the RF signal attenuation corresponding to a given wall. An RF prediction algorithm can use these wall types in selecting values characterizing the RF absorption and reflection properties of the objects within the model. In one implementation, the vector file may further include the raster image data, from which the vector file was created, as an <IMAGE> element. Other implementations are possible; for example, each line element can be represented by an endpoint location, a magnitude, and a direction. The location diagram editing application can use the raster image in the <IMAGE> portion of the vector file to overlay (or underlay) the raster image on the graphical representation of the vector model. In one implementation, the graphical user interface allows the user to toggle on/off the display of the raster image.

As discussed above, both before and after the vector model has been created, the location diagram editing application allows the user to specify and configure the filters and other optimizations to be used in optimizing the vector file. In the flow diagram of FIG. 2, a user has selected an optimization settings command, causing the location diagram editing application to present an interface that allows a user to select and configure one or more vector optimization settings (204). For example and as FIG. 8 illustrates, the graphical user interface 20, in one embodiment, includes a window 30 that details the list of filter and optimization settings, and allows the user to modify one or more parameters associated with them. Among the various vector optimization operations, window 30 allows the user to select and configure a line recognition filter, a snap filter and a merge filter, as discussed below.

FIG. 10 shows user interface 20 containing a graphical representation of a vector model after application of various vector optimization operations to the vector model depicted in FIG. 9. As discussed above, in one implementation, the location diagram editing application allows the user to repeatedly re-configure one or more vector optimization settings and view the resulting vector file until the user is satisfied with the results. After automatic operations by the location diagram editing application, the user may further modify the resulting vector model, as discussed above. Other process flows are possible. For example, the location diagram editing application, in one implementation, may automatically convert the raster image to a vector model, without application of the vector optimization filters discussed herein, and present the vector model in an editable window. The user may then manually edit the resulting vector model and/or apply the vector optimization filters to the raw vector model. In addition, the location diagram editing application allows the user to select individual vector optimization operations for execution, as well as the order in which they are applied. Still further, the location diagram editing application may also operate on pre-existing vector models either created by earlier conversions of raster images, or by an editing application, such as a CAD program, that creates and operates on vector files.

Figure 3:
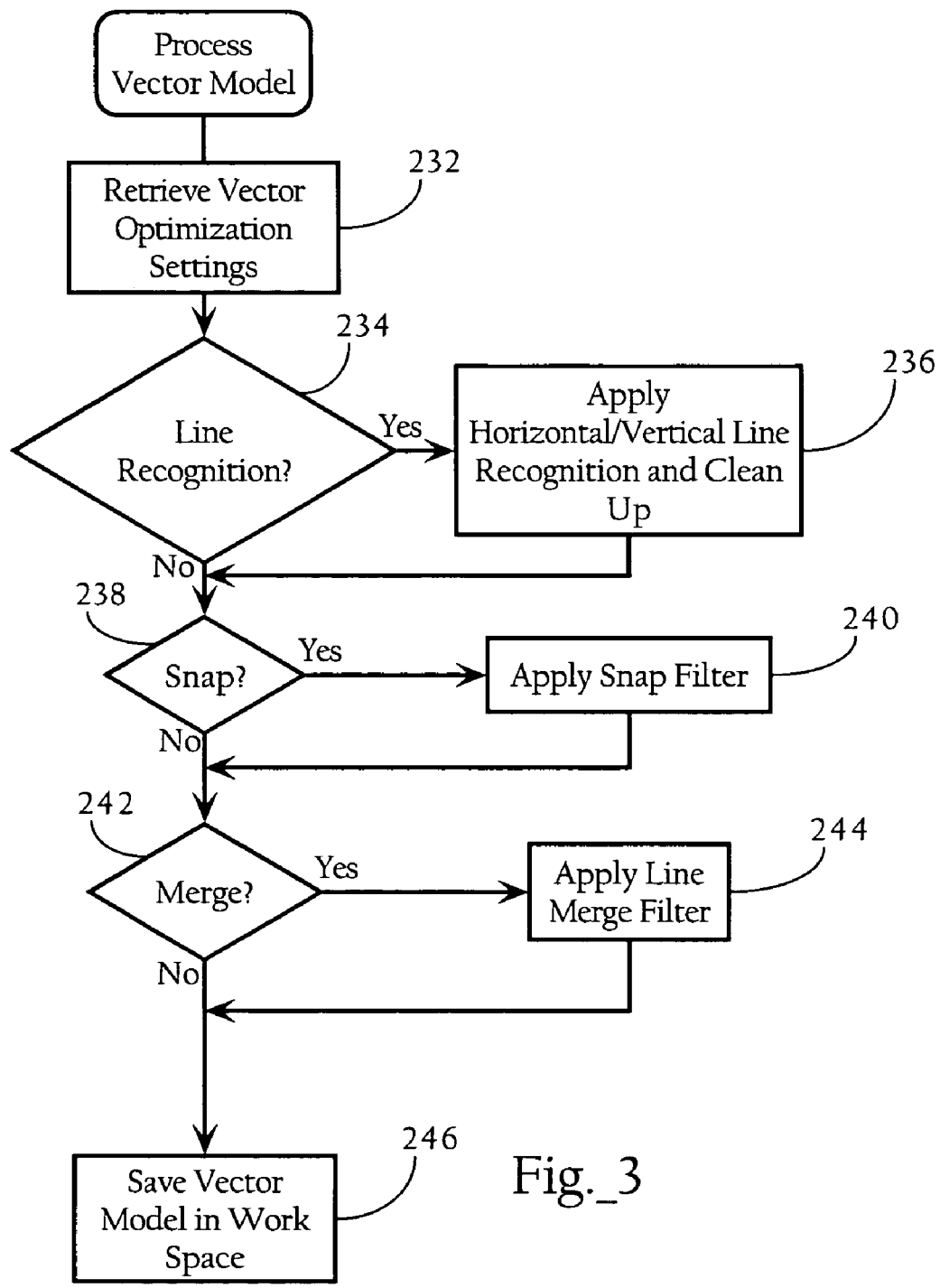
FIG. 3 is a flow chart diagram providing a sequence of vector optimization operations according to one implementation of the present invention.

FIG. 3 illustrates the process flow, according to one implementation of the present invention, directed to processing a vector model according to one or more vector optimization operations. As discussed above, the location diagram editing application supports a line recognition filter, a snap filter and a merge filter which a user may individually select. As discussed more fully below, the line recognition filter operates on the vector objects to adjust near-vertical lines (as defined by a configurable threshold angle) to vertical, and near-horizontal lines to horizontal. In some configuration modes, the line recognition filter may also delete lines that are oriented at an angle greater than a threshold from the x-axis and y-axis to, for example, clean up vector objects corresponding to text and other elements that are usually analytically irrelevant to modeling RF propagation. The snap filter, in one implementation, operates to extend closely spaced objects that are oriented within a threshold distance from each other. The merge filter operates, in one implementation, to merge closely spaced parallel lines to, for example, adjust the vector file to correctly model a wall with a single vector object.

When invoked, the location diagram editing application first retrieves the vector optimization settings specified by the user, or in one embodiment, a set of default vector optimization settings (232). Accordingly, the location diagram editing application, in one implementation, then determines whether the line recognition operation has been selected (234) and, if so, applies the line recognition and clean up operations discussed below (236). Similarly, if the snap filter (238) and/or merge filter (242) has been selected, the location diagram editing application applies the snap filter and/or merge filter operations (240, 244). The location diagram editing application may also perform other vector optimization operations, such as applying a default wall type indicator to the vector objects in the vector model. The location diagram editing application, in one embodiment, saves the modified vector model in a temporary work space (246) in dynamic random-access memory, for example, or a temporary file on a hard drive or other non-volatile memory space.

Line Recognition Filter

Figure 4:
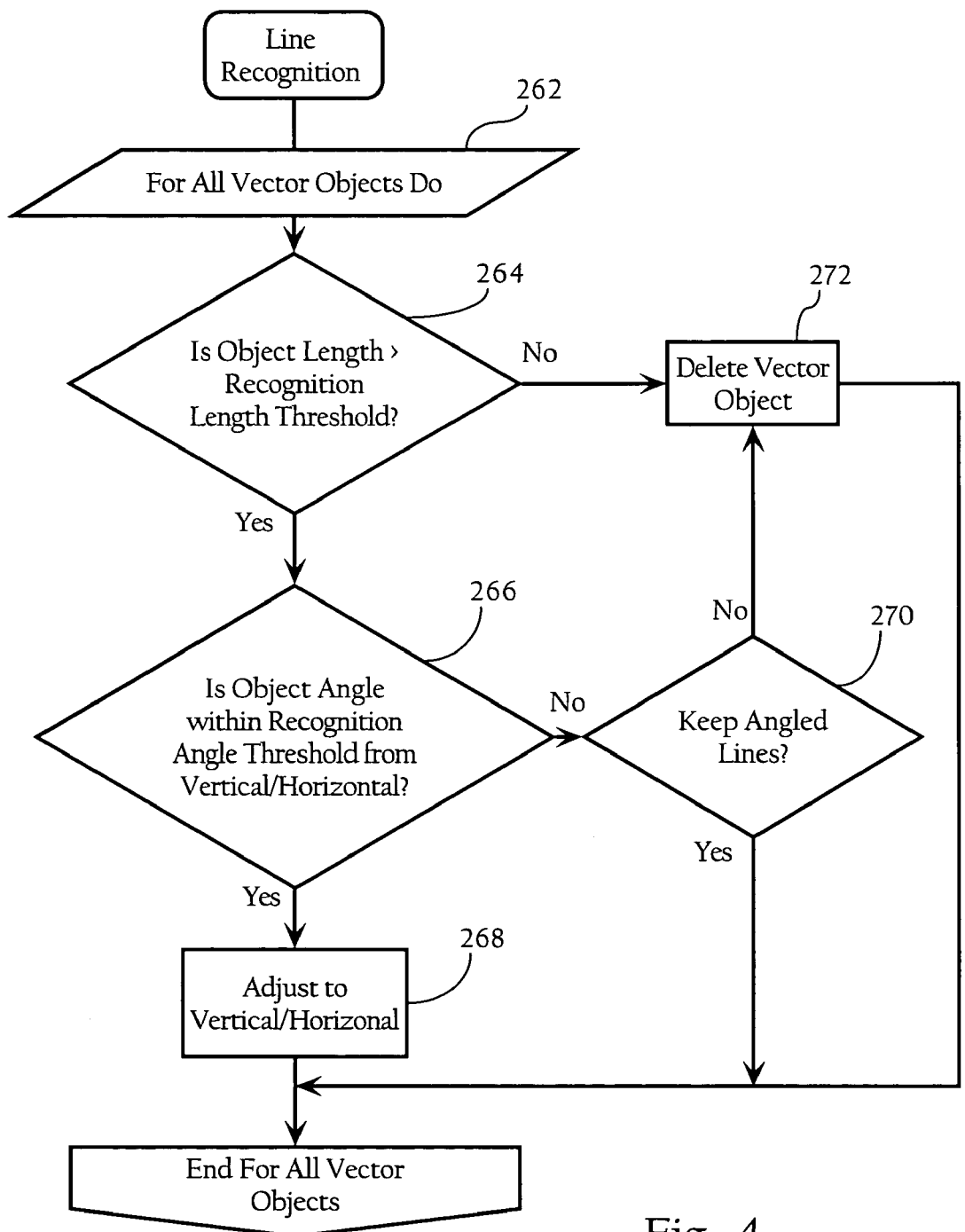
FIG. 4 is a flow chart diagram showing the process flow, according to one implementation of the present invention, corresponding to a line recognition filter.

FIG. 4 illustrates the process flow, according to one implementation of the present invention, associated with the line recognition filter implemented by the location diagram editing application. As FIG. 4 illustrates, the location diagram editing application applies a line recognition filter that compares the length and angle of each vector object (see 262) in the vector model against corresponding threshold values. As discussed above, the threshold recognition length and angle from vertical or horizontal are configurable parameters. As FIG. 4 shows, for a given vector object, the location diagram editing application compares the length of the vector object to the threshold recognition length (264). If the length of the vector object is less than the threshold recognition length, the location diagram editing application deletes the vector object (272). Otherwise, the location diagram editing application then compares the angle of the vector object relative to the x-axis (horizontal) and y-axis (vertical) (266). If the vector object is oriented an angle greater than either the horizontal or vertical threshold recognition angles, the location diagram editing application deletes the vector object (272) if the vector optimization settings specify that angled lines are to be deleted (270). Otherwise, if the vector object angle is within the threshold recognition angle from the vertical or horizontal axis, the location diagram editing application adjusts the coordinates of the vector object to create a vertical or horizontal line (268). For example, if a line is oriented at 5 degrees from the vertical axis (and 5 degrees is less than the vertical threshold recognition angle), the location diagram editing application modifies one or more of the coordinates in the vector element corresponding to the line to create a vertical line (i.e., where the x-coordinates of the endpoints are equal). In one embodiment, the new x-coordinate is the x-coordinate corresponding to the midpoint of the line. In other implementations, the location diagram editing application can select one of the endpoint coordinate locations and modify the x-coordinate of the other endpoint to equal that of the selected endpoint. Adjusting lines to horizontal can be accomplished in a similar manner.

Snap Filter

Figure 5A:
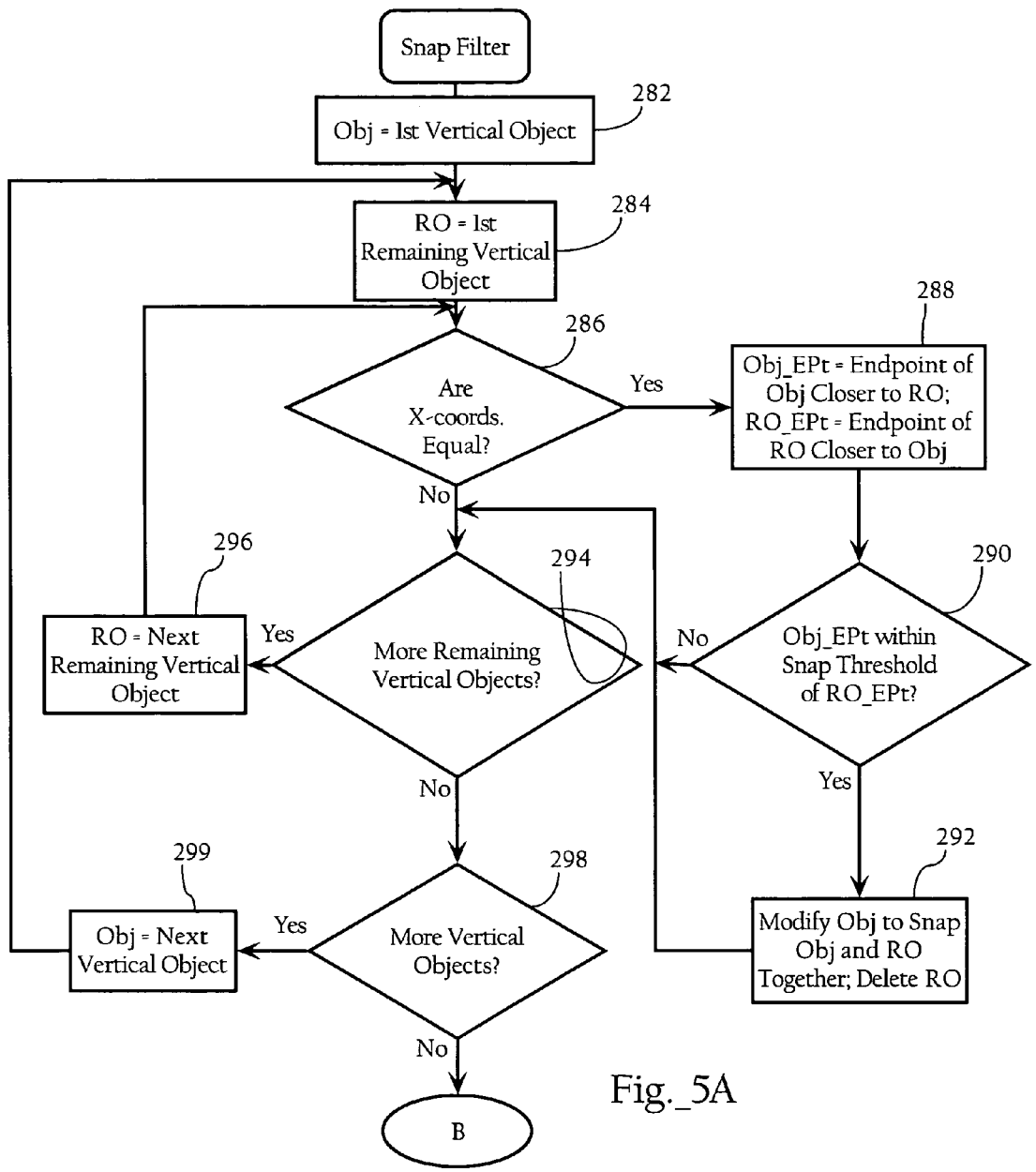
Figure 5C:
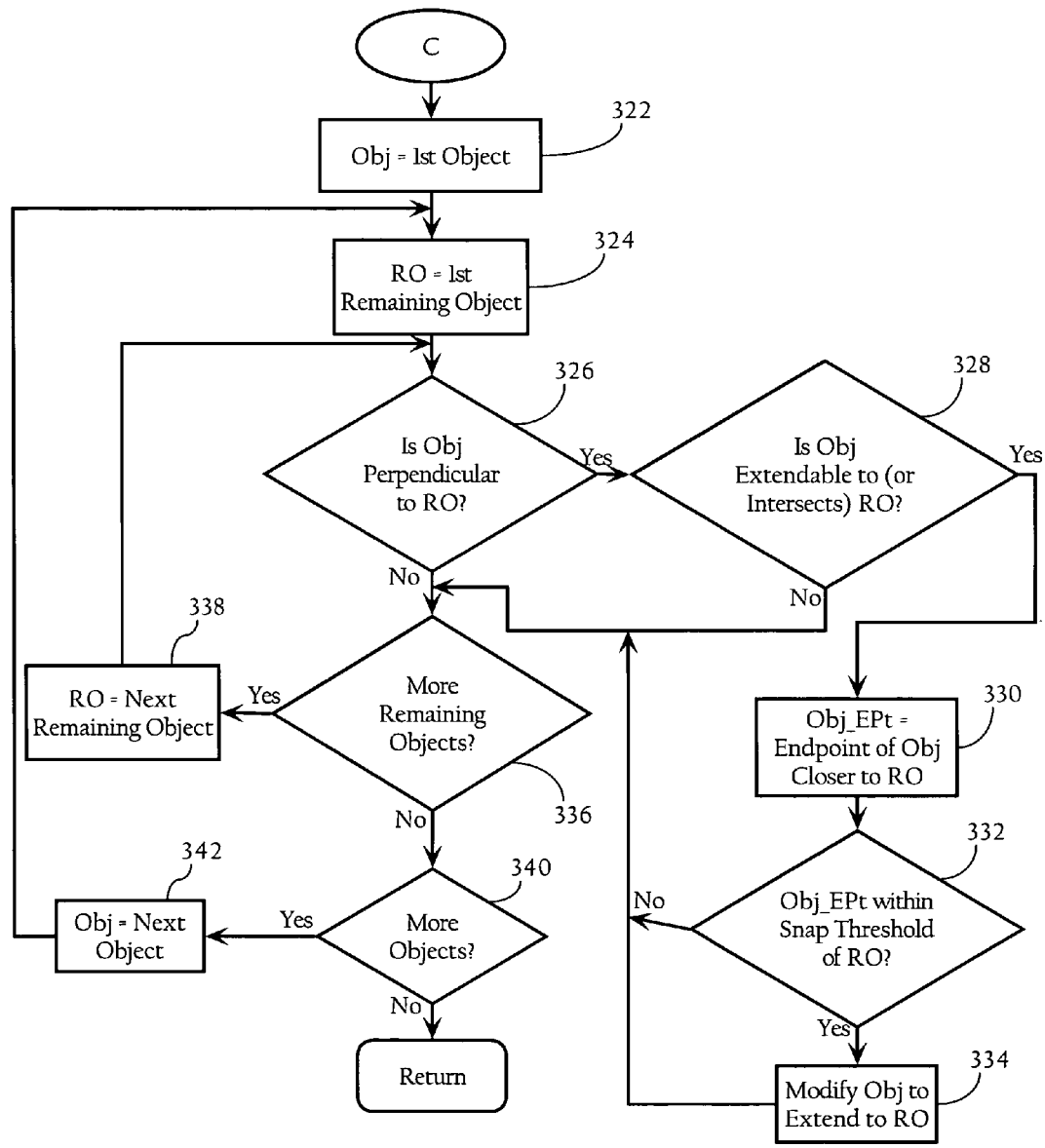

FIGS. 5A, 5B and 5C, together, illustrate a method, according to one implementation of the present invention, directed to snapping together closely spaced line elements. As these Figures and the description below demonstrates, the snap filter of the location diagram editing application, in one implementation, operates on all lines where an endpoint of a first line is within a threshold snap distance of a second line and the first line can be extended to intersect the second line. As the Figures also illustrate, the snap filter, in one implementation, operates on all vertical lines first, all horizontal lines, and then all lines that are perpendicular to one another. As one skilled in the art will recognize, the sequence of operations performed by the snap filter can be configured in a variety of manners.

As FIG. 5A illustrates, the location diagram editing application, starting with the first vertical object in the vector file (282), compares the x-coordinate of the instant vertical object (Obj) to the x-coordinate of the first remaining vertical object (RO) (284, 286). If the x-coordinates are equal (meaning that the instant object is extendable to the remaining object), the location diagram editing application compares the distance between the closest respective endpoints (Obj_EPt & RO_EPt) of the instant object (Obj) to the remaining object (RO) to a threshold snap distance (288, 290). If the distance between these endpoints is less than the snap threshold, the location diagram editing application modifies the instant object (Obj) to snap the instant object (Obj) and the remaining object (RO) together, and deletes the remaining object (292). In one implementation, this is accomplished by modifying the endpoint of the instant object closest to the remaining object (Obj_EPt) to match the endpoint of the remaining object that is further away from the instant object (Obj). Relative to the instant object (Obj), the location diagram editing application repeats the foregoing steps for all remaining vertical objects in the vector file (294, 296). Additionally, the location diagram editing application processes all vertical objects in the vector file in the same manner (298, 299).

After all vertical objects have been evaluated, the location diagram editing application then applies the snap filter to all horizontal lines. FIG. 5B illustrates operation of the snap filter in this regard. As one skilled in the art will recognize, operation of the snap filter as to horizontal lines is essentially the same as the vertical lines. In one implementation, the location diagram editing application, starting with the first horizontal object in the vector file (302), compares the y-coordinate of the instant horizontal object (Obj) to the y-coordinate of the first remaining horizontal object (RO) (304, 306). If the x-coordinates are equal (meaning that the instant object is extendable along the x-axis to the remaining object), the location diagram editing application compares the distance between the closest respective endpoints (Obj_EPt & RO_EPt) of the instant object (Obj) to the remaining object (RO) to a threshold snap distance (308, 310). In one implementation, the snap threshold applied to the horizontal lines is the same as the vertical lines; however, in other implementations, a different snap threshold may be applied. If the distance between these endpoints is less than the snap threshold, the location diagram editing application modifies the instant object (Obj) to snap the instant object (Obj) and the remaining object (RO) together, and deletes the remaining object (312). As discussed above, this can be accomplished by modifying the endpoint of the instant object closest to the remaining object (Obj_EPt) to match the endpoint of the remaining object that is further away from the instant object (Obj). Relative to the instant object (Obj), the location diagram editing application repeats the foregoing steps for all remaining horizontal objects in the vector file (314, 316). Additionally, the location diagram editing application processes all horizontal objects in the vector file in the same manner (318, 319).

As FIG. 5C illustrates, the snap filter also operates to extend a first object that is perpendicular to a second object and within a threshold distance of the second object. In the implementation shown, the location diagram editing application, starting with the first object in the vector file (322), determines whether the instant object (Obj) is perpendicular to the first remaining object (RO) in the vector file (324, 326). If so, the location diagram editing application then determines whether the instant object can be extended to meet the remaining object (328). FIGS. 5D, 5E, 5F 5G & 5H graphically illustrate the concept of whether one object is extendable to a second, perpendicular object. For example, as depicted in FIG. 5E, object (Obj) is extendable to the endpoint of a remaining object (RO). Similarly, object (Obj) in FIG. 5F is extendable to the remaining object RO. FIGS. 5D and 5G, however, illustrate situations where the object (Obj) cannot be extended to intersect the remaining object (RO). Still further, FIG. 5H illustrates a situation where the object (Obj) intersects and extends beyond the remaining object (RO). In one implementation, the merge filter can be configured to shorten the object (Obj) to extend to the remaining object (RO), eliminating the overlap, if the object's endpoint is within a snap threshold distance of the remaining object. One of ordinary skill in the art will recognize how these graphical illustrations can be implemented based on evaluations of the x- and y-coordinates of the endpoints of the object (Obj) and remaining object (RO).

If the instant object (Obj) can be extended to intersect (or does intersect) the remaining object (RO), the location diagram editing application then evaluates the shortest distance between the endpoint of the object (Obj) closest to the remaining object (Obj_EPt) and the remaining object (RO) (330, 332). If this distance is within a snap threshold (332), the location diagram editing application modifies the instant object (Obj) to intersect (or extend to) the remaining object (334). Since the object (Obj) and the remaining object are perpendicular, however, the location diagram editing application does not delete the remaining object from the vector file. Lastly, as FIG. 5C shows, the location diagram editing application repeats the foregoing steps, relative to the instant object (Obj), for all remaining objects in the vector file (336, 338). Additionally, the location diagram editing application processes all objects in the vector file in the same manner (340, 342). Accordingly, this operation can join the endpoints of perpendicular lines, as well as simply extend (or shorten) one line to intersect with a second perpendicular line.

Merge Filter

FIG. 6 sets forth a method directed to merging closely spaced parallel lines in the vector model according to one implementation of the present invention. As FIG. 6 illustrates, the location diagram editing application, starting with the first vector object in the vector file (352), scans the vector file to determine whether any remaining object in the vector file should be merged with the instant object. In the implementation shown, the location diagram editing application determines whether the remaining object is parallel to the instant object (354). If so, the location diagram editing application then determines whether the shortest distance between the remaining object (RO) and the object (Obj) is within a threshold distance (356). Lastly, the location diagram editing application determines whether the overlap between the instant and remaining objects are greater than a threshold overlap (358). The threshold overlap can be expressed as an absolute distance, or as relative percentage of the instant object (Obj) or the remaining object (RO). If all conditions are met, the location diagram editing application modifies the instant object to merge the instant and remaining object, and deletes the remaining object (360). As FIG. 6 illustrates, after all remaining objects have been examined relative to the instant object (353), the location diagram editing application proceeds to the next object in the vector file (362, 364). Other implementations are possible; for example, the threshold overlap determination can be an optional condition that a user can toggle on or off as desired. Still further, the merger of two objects can be accomplished in a variety of ways. For example, in its simplest form, a merger can be accomplished by simply deleting the remaining object (RO), or deleting the instant object (Obj). In the case of two vertical lines, for example, the location diagram editing application can modify the x-coordinate of the object (Obj) to be the x-coordinate value between Obj and RO. Still further, the location diagram editing application can also modify the y-coordinate endpoints of the instant object (Obj) to set them to the y-coordinate endpoints that are the furthest apart in the set of endpoints corresponding to the instant object (Obj) and the remaining object. One skilled in the art will recognize that myriad merge operations are possible and that the selection of a given set of merge operations is a matter or engineering or design choice.

The resulting optimized vector file can be used in a variety of ways. For example, the user can modify the vector file to specify wall types corresponding to each vector object. The user may also specify the location of one or more wireless access points within the physical location modeled by the vector file. This vector file can be used in connection with an RF prediction algorithm to model the RF coverage provided by the wireless access points to allow a network administrator to plan the desired deployment locations for the access points. In another implementation, the RF prediction algorithm may be used to create one or more RF coverage maps corresponding to infrastructure radio transceivers for use in connection with a location tracking system. The above-identified patent applications describe location tracking systems and the use of RF prediction tools that create a comprehensive map of the RF topology in a given environment. This information is then stored in a database and compared to real-world RF signal strength measurements gathered by infrastructure radio transceivers to determine the precise location of wireless devices.

Still further, in the embodiments described above, the present invention is executed within the context of a location diagram editing software application installed on a general purpose computer. FIG. 11 illustrates, for didactic purposes, the system architecture of a general purpose computer according to one implementation of the present invention. The present invention, however, can be implemented on a wide variety of computer system architectures. In one embodiment, the above-described system architecture operates in connection with computer hardware system 800 of FIG. 11. An operating system manages and controls the operation of system 800, including the input and output of data to and from the location diagram editing application, as well as other software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 11 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, network/communication interface 824 is used to provide communication between system 800 and any of a wide range of conventional networks, such as an Ethernet network, a wireless (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the operations of the location diagram editing application are implemented as a series of software routines run by hardware system 800 of FIG. 11. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language and stored in compiled form on mass storage device 820. However, these routines may be implemented in any of a wide variety of programming languages, including Visual Basic, Java, etc. In alternate embodiments, the present invention is implemented in discrete hardware or firmware. For example, an application specific integrated circuit (ASIC) could be programmed with the above described functions of the present invention.

The invention has been explained with reference to specific embodiments. For example, although the embodiments described above operate in connection with handoff determinations between a WLAN network and a cellular network, the present invention can be used in connection with mobility operations between a first WLAN domain and a second WLAN domain. In addition, while embodiments of the present invention have been described as operating in connection with IEEE 802.11 networks, the present invention can be used in connection with any WLAN environment. Other embodiments will be evident to those of ordinary skill in the art. It is therefore not intended that the invention be limited except as indicated by the appended claims.

What is claimed is:

1. A method facilitating the optimization of vector models for modeling RF propagation, comprising
   storing a vector file in a computer-readable medium, wherein the vector file models a physical environment and comprises a plurality of vector objects, each vector object including a set of parameters defining the location and orientation of a physical element relative to a location coordinate system including a horizontal axis and a vertical axis;
   applying a line recognition filter to a vector object in the vector file, wherein the line recognition filter is operative to
      compare the length of the vector object to a threshold recognition length;
      compare the angle of orientation of the vector object, relative to the horizontal and vertical axes, to corresponding vertical and horizontal threshold recognition angles; and
      automatically delete the vector object, if the length of the vector object is less than the threshold recognition length.

2. The method of claim 1 wherein the line recognition filter is further operative to automatically delete the vector object, if the angle of orientation of the vector object, relative to the corresponding horizontal and vertical axes, is greater than the vertical and horizontal threshold recognition angles.

3. The method of claim 1 wherein the line recognition filter is further operative to automatically adjust the vector object to a horizontal orientation if the angle of orientation of the vector object relative to the horizontal axis is less than the horizontal threshold recognition angle.

4. The method of claim 1 wherein the line recognition filter is further operative to automatically adjust the vector object to a vertical orientation if the angle of orientation of the vector object relative to the vertical axis is less than the vertical threshold recognition angle.

5. The method of claim 1 further comprising applying a snap filter to the vector file, wherein the snap filter is operative to conditionally extend a first vector object to intersect a second vector object.

6. The method of claim 1 further comprising applying a snap filter to the vector file, wherein the snap filter is operative to
   determine whether a first vector object can be extended to intersect, or currently intersects, a second vector object;
   determine whether an endpoint of the first vector object is within a snap threshold distance of the second vector object; and
   modify the first vector object to extend to the second vector object.

7. The method of claim 1 further comprising applying a merge filter to the vector file, wherein the merge filter is operative to merge parallel vector objects within a threshold merge distance.

8. The method of claim 1 wherein the vector object contains a first endpoint location and a second endpoint location.

9. The method of claim 1 wherein the vector object contains an endpoint location, a magnitude, and a direction.

10. The method of claim 1 further comprising
   receiving and storing, prior to storing the vector file, a raster image file of the physical environment; and
   converting the raster image file to the vector file.

11. An apparatus facilitating the optimization of vector models for modeling RF propagation comprising:
   a processor;
   a memory;
   a software application, physically stored in the memory, comprising instructions operable to cause the processor and the apparatus to:
   store a vector file in the memory, wherein the vector file models a physical environment and comprises a plurality of vector objects, each vector object including a set of parameters defining the location and orientation of a physical element relative to a location coordinate system including a horizontal axis and a vertical axis;
   apply a line recognition filter to a vector object in the vector file, wherein the line recognition filter is operative to
      compare the length of the vector object to a threshold recognition length;

compare the angle of orientation of the vector object, relative to the horizontal and vertical axes, to corresponding vertical and horizontal threshold recognition angles; and automatically delete the vector object, if the length of the vector object is less than the threshold recognition length.

12. The apparatus of claim 11 wherein the line recognition filter is further operative to automatically delete the vector object, if the angle of orientation of the vector object, relative to the corresponding horizontal and vertical axes, is greater than the vertical and horizontal threshold recognition angles.

13. The apparatus of claim 11 wherein the line recognition filter is further operative to automatically adjust the vector object to a horizontal orientation if the angle of orientation of the vector object relative to the horizontal axis is less than the horizontal threshold recognition angle.

14. The apparatus of claim 11 wherein the line recognition filter is further operative to automatically adjust the vector object to a vertical orientation if the angle of orientation of the vector object relative to the vertical axis is less than the vertical threshold recognition angle.

15. The apparatus of claim 11 wherein the software application is further operative to cause the processor and the apparatus to apply a snap filter to the vector file, wherein the snap filter is operative to conditionally modify a first vector object to extend to a second vector object.

16. The apparatus of claim 11 wherein the software application is further operative to cause the processor and the apparatus to apply a snap filter to the vector file, wherein the snap filter is operative to determine whether a first vector object can be extended to intersect, or currently intersects, a second vector object;

determine whether an endpoint of the first vector object is within a snap threshold distance of the second vector object; and modify the first vector object to extend to the second vector object.

17. The apparatus of claim 11 wherein the software application is further operative to cause the processor and the apparatus to apply a merge filter to the vector file, wherein the merge filter is operative to merge parallel vector objects within a threshold merge distance.

18. The apparatus of claim 11 wherein the vector object contains a first endpoint location and a second endpoint location.

19. The apparatus of claim 11 wherein the vector object contains an endpoint location, a magnitude, and a direction.

20. The apparatus of claim 11 wherein the software application is further operative to cause the processor and the apparatus to receive and store a raster image file of the physical environment; and convert the raster image file to the vector file.

21. A computer program product, physically stored on a machine-readable medium, for facilitating the optimization of vector models for modeling RF propagation, comprising instructions operable to cause a programmable processor to:

store a vector file in a computer-readable memory, wherein the vector file models a physical environment and comprises a plurality of vector objects, each vector object including a set of parameters defining the location and orientation of a physical element relative to a location coordinate system including a horizontal axis and a vertical axis;

apply a line recognition filter to a vector object in the vector file, wherein the line recognition filter is operative to compare the length of the vector object to a threshold recognition length;

compare the angle of orientation of the vector object, relative to the horizontal and vertical axes, to corresponding vertical and horizontal threshold recognition angles; and automatically delete the vector object, if the length of the vector object is less than the threshold recognition length.

22. The computer program product of claim 21 wherein the line recognition filter is further operative to automatically delete the vector object, if the angle of orientation of the vector object, relative to the corresponding horizontal and vertical axes, is greater than the vertical and horizontal threshold recognition angles.

23. The computer program product of claim 21 wherein the line recognition filter is further operative to automatically adjust the vector object to a horizontal orientation if the angle of orientation of the vector object relative to the horizontal axis is less than the horizontal threshold recognition angle.

24. The computer program product of claim 21 wherein the line recognition filter is further operative to automatically adjust the vector object to a vertical orientation if the angle of orientation of the vector object relative to the vertical axis is less than the vertical threshold recognition angle.

25. The computer program product of claim 21 wherein the instructions are further operative to cause the programmable processor to apply a snap filter to the vector file, wherein the snap filter is operative to conditionally modify a first vector object to extend to a second vector object.

26. The computer program product of claim 21 wherein the instructions are further operative to cause the programmable processor to apply a snap filter to the vector file, wherein the snap filter is operative to determine whether a first vector object can be extended to intersect, or currently intersects, a second vector object;

determine whether an endpoint of the first vector object is within a snap threshold distance of the second vector object; and modify the first vector object to extend to the second vector object.

27. The computer program product of claim 21 wherein the instructions are further operative to cause the programmable processor to apply a merge filter to the vector file, wherein the merge filter is operative to merge parallel vector objects within a threshold merge distance.

28. The computer program product of claim 21 wherein the vector object contains a first endpoint location and a second endpoint location.

29. The computer program product of claim 21 wherein the vector object contains an endpoint location, a magnitude, and a direction.

30. The computer program product of claim 21 wherein the instructions are further operative to cause the programmable processor to receive and store a raster image file of the physical environment; and convert the raster image file to the vector file.

* * * * *